United States Patent
Shiina et al.

(10) Patent No.: US 7,240,762 B2
(45) Date of Patent: Jul. 10, 2007

(54) ELECTRIC POWER STEERING APPARATUS

(75) Inventors: Akihiko Shiina, Nara (JP); Noritake Okawa, Okayama (JP); Masayoshi Sakuda, Osaka (JP)

(73) Assignee: Koyo Seiko Co., Ltd., Osaka-shi, Osaka (JP)

( * ) Notice: Subject to any disclaimer, the term of this patent is extended or adjusted under 35 U.S.C. 154(b) by 172 days.

(21) Appl. No.: 10/721,751

(22) Filed: Nov. 26, 2003

(65) Prior Publication Data
US 2004/0163881 A1    Aug. 26, 2004

(30) Foreign Application Priority Data
Nov. 29, 2002    (JP)    ............ P.2002-348529

(51) Int. Cl.
 B62D 5/02    (2006.01)
 B62D 5/04    (2006.01)
 F16H 1/16    (2006.01)
 F16H 55/17    (2006.01)
 F16H 55/18    (2006.01)

(52) U.S. Cl. .......... 180/444; 180/443; 180/446; 74/409; 74/425; 74/440; 74/458; 74/388 PS

(58) Field of Classification Search ........ 180/443, 180/444, 446; 74/425, 458, 388 PS, 409, 74/440
See application file for complete search history.

(56) References Cited

U.S. PATENT DOCUMENTS 3,661,031 A * 5/1972 Mizukoshi et al. ........ 74/462
3,710,640 A * 1/1973 Stanger et al. ............ 74/425
3,810,395 A * 5/1974 Takahashi et al. ........ 74/89.23
4,011,764 A * 3/1977 Buck et al. ............... 74/499
4,228,696 A * 10/1980 Jablonsky ................. 74/499

(Continued)

FOREIGN PATENT DOCUMENTS

DE    2458320    6/1976

(Continued)

OTHER PUBLICATIONS

Korean Office Action dated Jan. 30, 2007 with an English translation.

(Continued)

*Primary Examiner*—Lesley D. Morris
*Assistant Examiner*—Marc A. Scharich
(74) *Attorney, Agent, or Firm*—McGinn IP Law Group, PLLC

(57) ABSTRACT

A gearing radius of a worm wheel is set corresponding to a neighborhood region of a steering neutral position, in such a way as to be relatively large. Thus, backlash is made to be relatively small. This prevents noises from being produced when an automobile travels straight on a bad road. Conversely, the backlash is set corresponding to most of regions of steering angles, which are within the remaining region thereof, in such a manner as to be relatively large. Thus, increase in resistance torque is suppressed. This is realized by a simple configuration in which a bias portion is provided in a part of the profile of teeth. In a case where power is transmitted from an electric motor by a worm shaft and a worm wheel during a steering operation, noises are hard to be produced even when the automobile travels on a bad road.

28 Claims, 4 Drawing Sheets

U.S. PATENT DOCUMENTS

| | | | |
|---|---|---|---|
| 4,444,070 A * | 4/1984 | Yanai | 74/422 |
| 4,475,413 A * | 10/1984 | Higuchi | 74/422 |
| 5,445,238 A * | 8/1995 | Chikuma et al. | 180/444 |
| 5,738,183 A * | 4/1998 | Nakajima et al. | 180/444 |
| 5,819,871 A * | 10/1998 | Takaoka | 180/444 |
| 6,041,887 A * | 3/2000 | Kojo et al. | 180/446 |
| 6,354,395 B1 * | 3/2002 | Cheng et al. | 180/444 |
| 6,357,313 B1 * | 3/2002 | Appleyard | 74/388 PS |
| 6,390,230 B1 * | 5/2002 | Shimizu et al. | 180/444 |
| 6,425,455 B1 * | 7/2002 | Kurokawa et al. | 180/444 |
| 6,470,994 B1 * | 10/2002 | Shimizu et al. | 180/446 |
| 6,491,131 B1 * | 12/2002 | Appleyard | 180/444 |
| 6,516,915 B2 * | 2/2003 | Kurokawa et al. | 180/444 |
| 6,550,567 B2 * | 4/2003 | Murakami et al. | 180/444 |
| 6,561,306 B2 * | 5/2003 | Watanabe et al. | 180/444 |
| 6,725,964 B2 * | 4/2004 | Appleyard | 180/444 |
| 6,776,064 B2 * | 8/2004 | Bucholz et al. | 74/425 |

FOREIGN PATENT DOCUMENTS

| | | |
|---|---|---|
| DE | DT 2458320 A1 | 6/1976 |
| DE | 10038167 A | 2/2002 |
| JP | 2000-043739 | 2/2000 |
| JP | 2000-43739 | 2/2000 |
| KR | 2001-0023614 | 3/2001 |

OTHER PUBLICATIONS

Schoo A et al: "Schneckengetriebe Mit Spieleinstellbarer Verzahnung" Antriebstechnik, Krausskopf Verlag Fur Wirtschaft GMBH, Mainz, DE, vol. 30, No. 4, Apr. 1, 1991 (Apr. 1, 1991), pp. 94-97, XP000217829 ISSN: 0722-8546.

European Search Report dated Oct. 7, 2004.

* cited by examiner

ELECTRIC POWER STEERING APPARATUS

BACKGROUND OF THE INVENTION

The present invention relates to an electric power steering apparatus using a motor as a source of a steering assisting force.

When a steering member, such as a steering wheel is rotation-operated, a related automotive electric power steering apparatus controls output rotation of an electric motor according to steering torque loaded on the steering member. A rotation of the electric motor is transmitted to a steering mechanism through a reduction gear mechanism to thereby assist the steering mechanism in response to a rotation operation of the steering member. Consequently, labor burden imposed on a driver for steering is reduced.

Another related electric power steering apparatus, which uses a mechanism having, for example, a worm and a worm wheel as the reduction mechanism, has been provided (for instance, JP-A-2000-43739).

Meanwhile, in a case where backlash between the worm and the worm wheel is set to be large so as to reduce transmission resistance, this related electric power steering apparatus has encountered a problem of, for example, rattling noises due to a reverse input from tires when an automobile travels straight on a bad road, such as a gravel road.

Conversely, in a case where backlash is set to be stall so as to suppress rattling sounds, transmission resistance increases. Thus, this related electric power steering apparatus has a problem in that when the state of the automobile is changed from a cornering state to a straight traveling state, the return of a steering wheel is worsened.

From the aforementioned respects, it is very difficult to realize a reduction mechanism that has low transmission resistance and that makes less noise.

SUMMARY OF THE INVENTION

The invention is accomplished in view of the aforementioned problems. Accordingly, an object of the invention is to provide an electric power steering apparatus enabled to realize a small increase in resistance torque and also enabled to suppress noise generation.

To achieve the foregoing object, according to the invention, there is provided an electric power steering apparatus (hereunder referred to as a first electric power steering apparatus of the invention), which is adapted to transmit power, which is supplied from an electric motor for assisting steering, through a driving gear and a driven gear. In this electric power steering apparatus, backlash between the driving gear and the driven gear is set at least in a neighborhood region of a steering neutral position to be smaller than that in a remaining region.

Inventors of the invention direct attention to the facts that even when a vehicle travels on a bad road, noises are hard to be produced in a case where each of gears transmits power from an electric motor during steering, and that noises are easily produced in a case where each of the gears does not transmit power from the electric motor during the vehicle straight travels on a bad road. Thus, in most of regions of steering angles other than a neighborhood region of the steering neutral position, the backlash between the driving gear and the driven gear is set to be a relatively large value according to which the suppression of resistance torque can be achieved. At least, in the neighborhood region of the steering neutral position, the backlash between the driving gear and the driven gear is set to be a relatively small value. Consequently, the first electric power steering apparatus of the invention prevents noises from being produced during straight traveling.

According to an embodiment (hereunder referred to as a second electric power steering apparatus of the invention) of the first electric power steering apparatus of the invention, the driven gear includes a bias portion formed by biasing a part of an outer periphery of teeth in a direction in which the backlash is decreased.

The second electric power steering apparatus of the invention can reduce increase in the resistance torque and suppress production of noises by utilizing a simple configuration in which a bias portion is provided in a part of outer peripheral portions of teeth.

According to an embodiment (hereunder referred to as a third electric power steering apparatus of the invention) of the first electric power steering apparatus of the invention, the driving gear is constituted by a worm. The driven gear is constituted by a worm wheel. The position of a shaft center of the worm is offset in an axial direction of the worm wheel by a predetermined offset amount.

The third electric power steering apparatus of the invention can reduce increase in the resistance torque and suppress production of noises by utilizing a simple configuration in which the position of the shaft center of the worm is offset in an axial direction of the worm wheel by a predetermined offset amount.

DETAILED DESCRIPTION OF PREFERRED EMBODIMENTS

Preferred embodiments of the invention are described hereinbelow by referring to the accompanying drawings.

Figure 1:
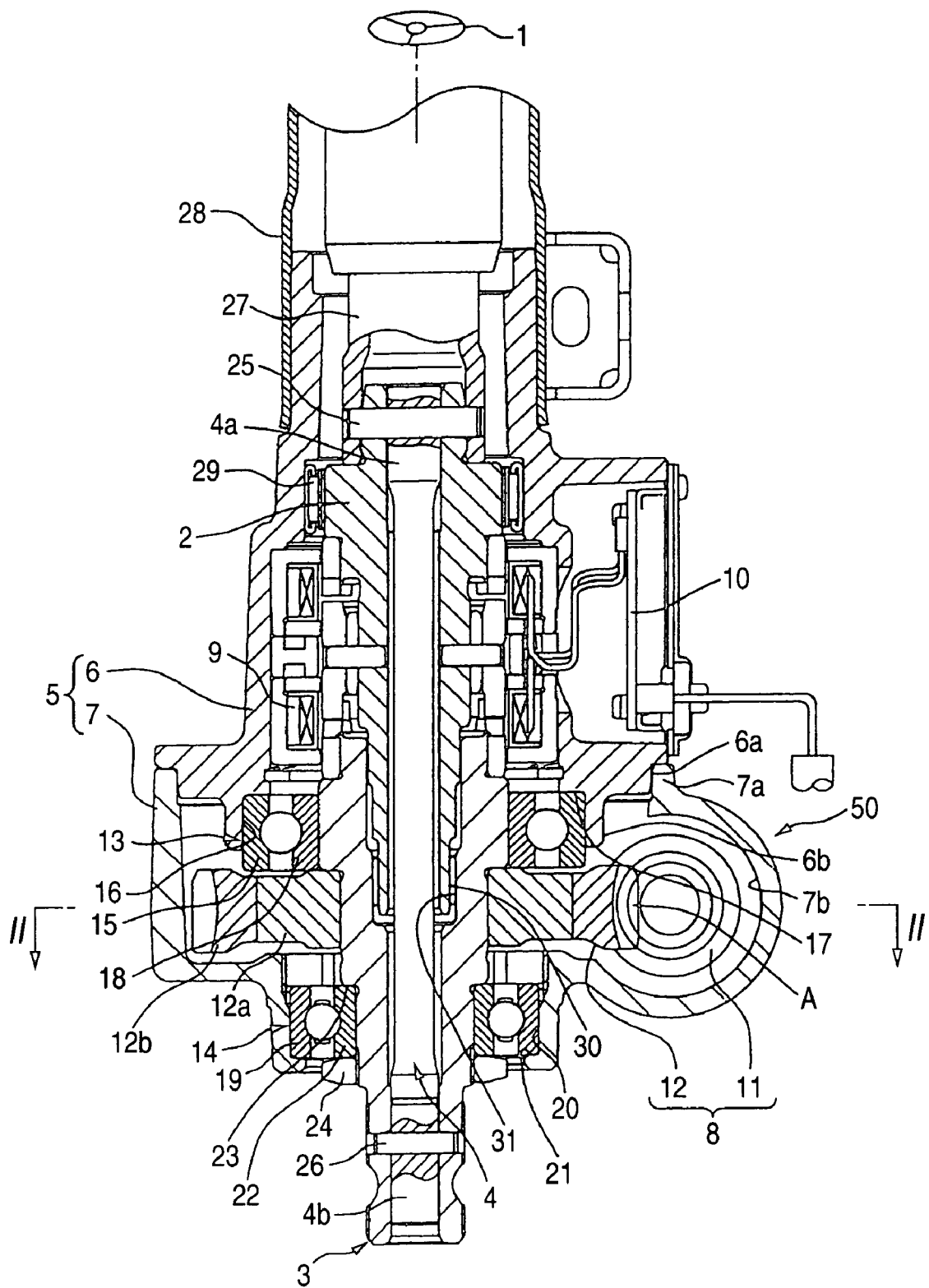
FIG. 1 is a schematic sectional view illustrating a primary part of an electric power steering apparatus that is an embodiment of the invention.

FIG. 1 is a schematic sectional view illustrating a primary part of an electric power steering apparatus that is an embodiment of the invention. Referring to FIG. 1, in this electric power steering apparatus (hereunder referred to simply as "the power steering apparatus"), a first steering shaft 2 serving as an input shaft, to which a steering wheel 1 is attached, is coaxially connected through a torsion bar 4 to a second steering shaft 3 serving as an output shaft to be connected to a steering mechanism (not shown), such as a rack-and-pinion mechanism.

A housing 5 for supporting the first steering shaft 2 and the second steering shaft 3 is made of, for example, an aluminum alloy, and attached to an automobile body (not shown). The housing 5 comprises a sensor housing 6 and a gear housing 7, which are fitted to each other. Concretely, the gear housing 7 is cylindrically shaped and has an annular edge portion 7a, which is provided at the top thereof and fitted to an annular step portion 6a provided on the bottom outer periphery of the sensor housing 6. The gear housing 7 accommodates a worm gear mechanism 8 serving as a reduction mechanism. The sensor housing 6 accommodates a torque sensor 9 and a control circuit board 10. A reduction gear 50 is constituted by accommodating the worm gear mechanism 8 in the gear housing 7.

Figure 2:
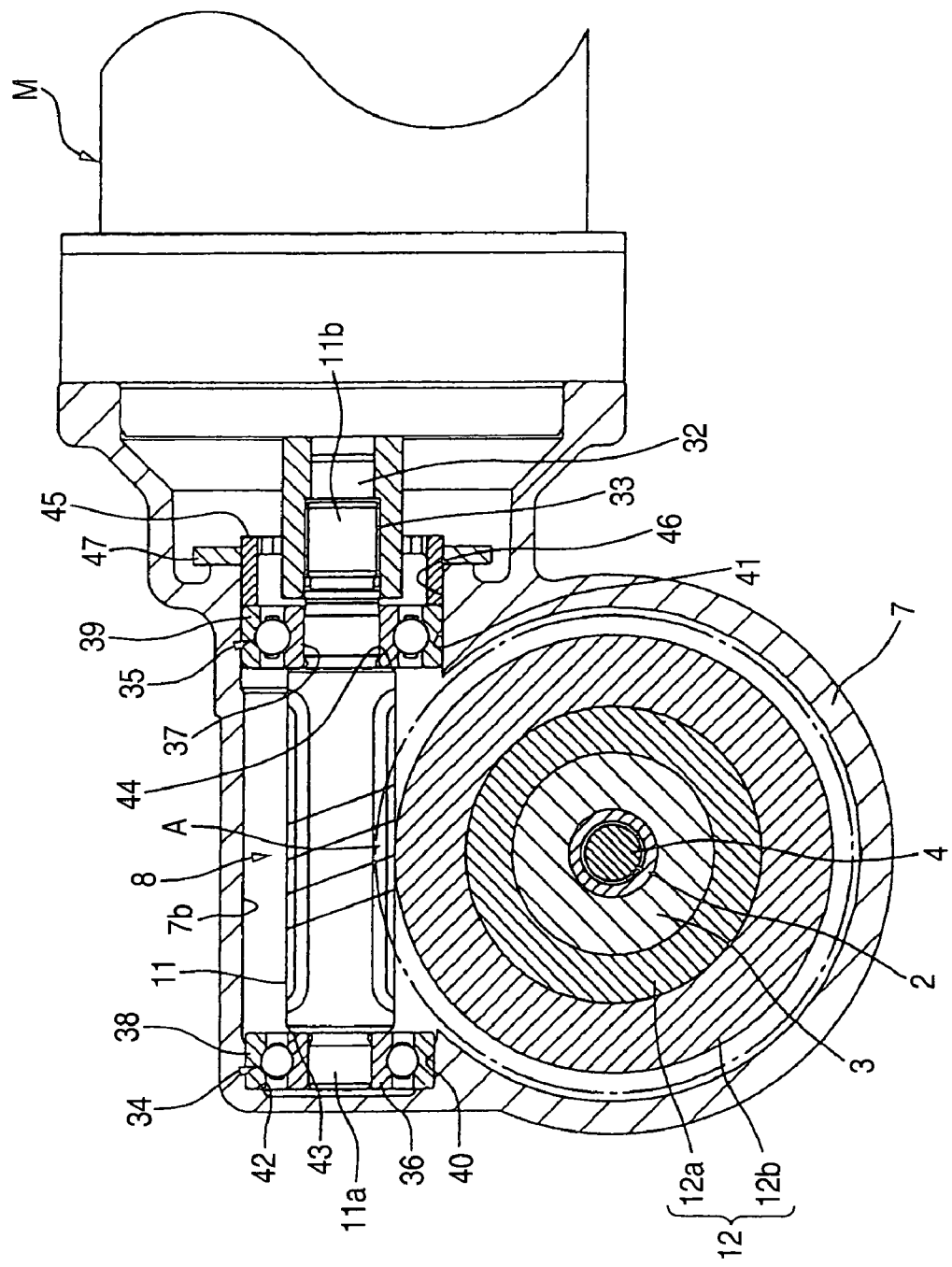
FIG. 2 is a sectional view taken along line II—II of FIG. 1.

The worm gear mechanism 8 has a copper worm shaft (or worm) 11, which is connected to a rotating shaft 32 of an electric motor M through a joint mechanism, for instance, a spline joint 33, as shown in FIG. 2, and also has a worm wheel 12 that meshes with this worm shaft 11, that is enabled to rotate integrally with an axially middle portion of the second steering shaft 3, as shown in FIG. 1, and that is restrained from moving in an axial direction. Although not shown in the figure, the worm shaft 11 is rotatably supported in the gear housing 7 through a pair of bearings.

The worm wheel 12 has an annular metal core 12a integrally rotatably connected to the second steering shaft and also has a synthetic resin member 12b that surrounds the metal core 12a and that has teeth provided on an outer peripheral surface portion thereof. The metal core 12a is inserted into a mold, for example, when the synthetic resin member 12b is resin-molded. The metal core 12a and the molded synthetic resin member 12b are integrally rotatably connected to each other.

In the gear housing 7, lubricant is filled in a region including at least a part A in which the worm shaft 11 and the worm wheel 12 mesh with each other. That is, lubricant may be filled only in the part A. Alternatively, lubricant may be filled in the part A and the entire rim part of the worm shaft 11. Alternatively, lubricant may be filled in the entire gear housing 7.

The second steering shaft 3 is supported by first and second rolling bearings 13 and 14 placed in such a way as to sandwich the worm wheel from above and below in an axial direction.

An outer ring 15 of the first rolling bearing 13 is fitted into and held in a bearing holding hole 16 provided in a cylindrical projection 6b that is formed at the bottom of the sensor housing 6. The top surface of the outer ring 15 of the first rolling bearing 13 abuts against an annular step portion 17 and is restrained from upwardly and axially moving toward the sensor housing 6. On the other hand, an inner ring 18 of the first rolling bearing 13 is interference-fitted to the second steering shaft 3. The bottom surface of the inner ring 18 abuts against the top surface of the metal core 12a of the worm wheel 12.

An outer ring 19 of the second rolling bearing 14 is fitted into and held in a bearing holding hole 20 provided in the gear housing 7. The bottom surface of the outer ring 19 of the second rolling bearing 14 abuts against an annular step portion 21 and is restrained from downwardly and axially moving toward the gear housing 7. An inner ring 22 of the second rolling bearing 14 is integrally rotatably attached to the second steering shaft 3 in such a way as to be restrained from performing axially relative displacement. The inner ring 22 is held between a step portion 23 and a nut 24 screwed onto a threaded portion of the second steering shaft 3.

The torsion bar 4 penetrates through the first steering shaft 2 and the second steering shaft 3. The top end 4a of the torsion bar 4 is integrally rotatably connected to the first steering shaft 2 by a connecting pin 25, while the bottom end 4b thereof is integrally rotatably connected to the second steering shaft 3 by a connecting pin 26. The bottom end of the second steering shaft 3 is connected to the steering mechanism, such as the rack-and-pinion mechanism, through an intermediate shaft (not shown).

The connecting pin 25 connects a third steering shaft 27, which is coaxially disposed with the first steering shaft 2, and the first steering shaft 2 in such a way as to integrally rotate therewith. The third steering shaft 27 penetrates through a tube 28 of a steering column.

An upper part of the fist steering shaft 2 is rotatably supported on the sensor housing 6 through a third rolling bearing 29 constituted by, for instance, a needle roller bearing. A diametrically reduced portion 30 provided at a lower part of the first steering shaft 2 is fitted in a hole 31 formed in an upper part of the second steering shaft by providing predetermined play in the direction of relative rotation between the first steering shaft 2 and the second steering shaft 3 so as to restrict the relative rotation therebetween within a predetermined range.

Referring next to FIG. 2, the worm shaft 11 is rotatably supported by each of a fourth rolling bearing 34 and a fifth rolling bearing 35, which are held by the gear housing 7. Each of the fourth rolling bearing 34 and the fifth rolling bearing 35 is constituted by, for example, a ball bearing.

Each of an inner ring 36 of the fourth rolling bearing 34 and an inner ring 37 of the fifth rolling bearing 35 is fitted into an associated one of narrow portions of the worm shaft 11. Each of an outer ring 38 of the fourth rolling bearing 34 and an outer ring 39 of the fifth rolling bearing 35 is held in bearing holding holes 40 and 41 of the gear housing 7, respectively.

The gear housing 7 includes a part 7b radially facing a part of a circumferential surface of the worm shaft 11. The outer ring 38 of the fourth rolling bearing 34 supporting one of end portions 11a of the worm shaft 11 abuts against the step portion 42 of the gear housing 7 and is positioned thereat. On the other hand, the inner ring 36 of the fourth rolling bearing 34 abuts against a positioning step portion of the worm shaft 11. Thus, the worm shaft 11 is restrained from moving toward the other end portion 11b of the worm shaft 11.

The inner ring 37 of the fifth rolling bearing 35, which supports a neighborhood portion of the other end portion (that is, the joint-side end portion) 11b of the worm shaft 11, abuts against the positioning step portion 44 of the worm shaft 11. Thus, the inner ring 37 is restrained from moving toward the end portion 11a of the worm shaft 11.

The outer ring 39 of the fifth rolling bearing 35 is pushed toward the fourth rolling bearing 34 by a pre-pressure adjustment screw member 45. The screw member 45 applies a pre-pressure to a pair of rolling bearings 34 and 35 by being screwed into a screw hole 46 formed in the gear housing 7. Also, the screw member 45 performs the axial positioning of the worm shaft 11. Reference numeral 47 designates a lock nut to be engaged with the screw member 45 so as to fix the screw member 45 after the pre-pressure is adjusted.

Figure 3:
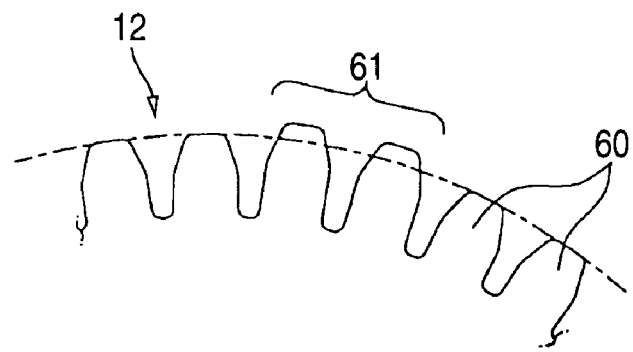
FIG. 3 is a schematic enlarged view illustrating a primary part of a worm wheel.
Figure 4:
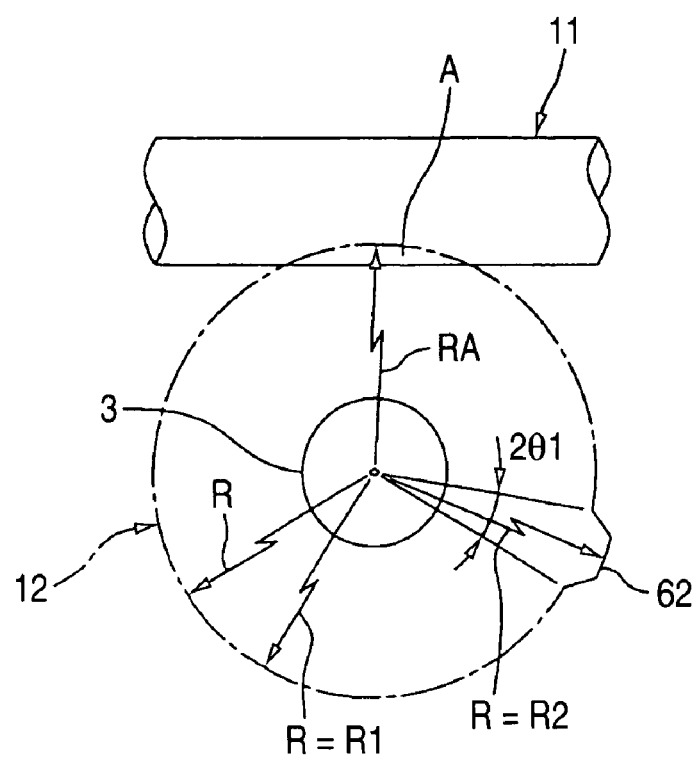
FIG. 4 is a schematic view illustrating a worm shaft and a worm wheel, which mesh with each other.

Referring next to FIG. 3, which is a schematic view, a bias portion 61 biased outwardly and radially is formed in a part of the profile of each of teeth 60. As shown in FIG. 4 that is a schematic view, the radius R of a pitch circle of the worm wheel 12, which is indicated by a dot-and-dash line, has a value R2 at a central portion of a part 62 corresponding to the bias portion 61 and is larger than a value R1 at the remaining part (that is, R2>R1).

As shown in FIG. 4, a gearing radius RA of the worm wheel 12 corresponds to a radius R of a pitch circle of the worm wheel 12 at a gearing part A in which the worm wheel 12 meshes with the worm shaft 11. The gearing radius RA has an intermediate value between the values R1 and R2 (R1≦R≦R2).

An angular range in which the bias portion 61 is provided, that is, an angular range of the portion 62 corresponding to the bias portion 61 is 2θ1. This range corresponds to a neighborhood region B1 of a steering neutral position (to be described later).

Figure 5A:
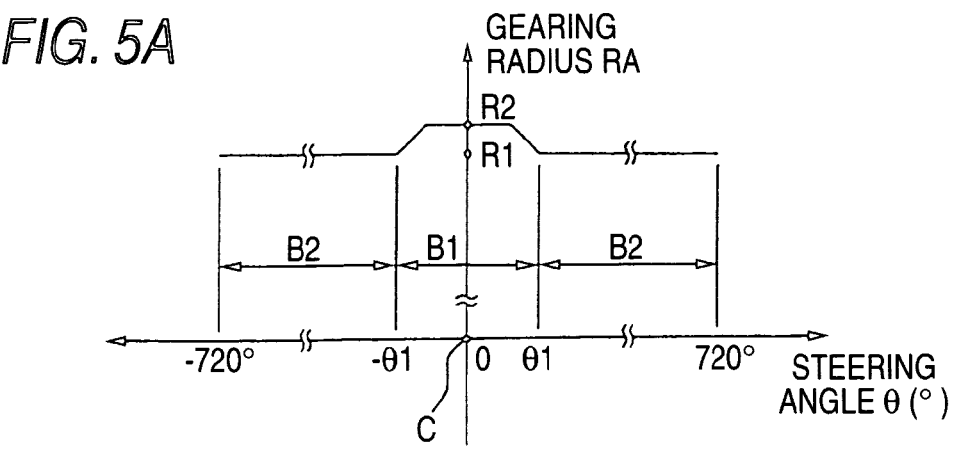
FIG. 5A is a graph illustrating the relation between a steering angle and a gearing radius of the worm wheel.

FIG. 5A is a graph showing the relation between a steering angle θ (that is, an angle of rotation of the steering wheel 1) and the gearing radius RA of the worm wheel 12. As shown in FIG. 5A, in the neighborhood region B1 (−θ1≦θ≦θ1) of the steering neutral position C (that is, a position corresponding to a steering angle θ (=0)), the gearing radius RA of the worm wheel 12 is set to be larger than that in the remaining region B2.

Figure 5B:
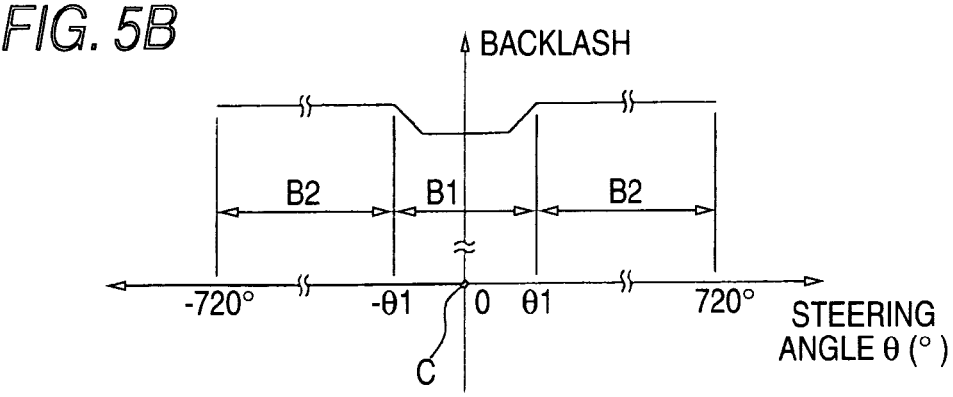
FIG. 5B is a graph illustrating the relation between a steering angle and backlash.

As shown in FIG. 5B, backlash between the worm shaft 11 and the worm wheel 12 in the neighborhood region B1 is set to be smaller than that therebetween in the remaining region B2.

In the worm wheel 12, the bias portion 61 is provided at a place, at which the bias portion 61 can mesh with the worm shaft, corresponding to the neighborhood region B1 of the neutral position C.

The neighborhood region B1 of the neutral position C is set on condition that θ1=10 degrees, that is, a steering-angle-change in both directions from the neutral position C ranges from −10 degrees to +10 degrees. This neighborhood region B1 may appropriately be set corresponding to each of vehicles.

Incidentally, let ΔRA1, α, and D denote an amount of change in the gearing angle RA per arc-minute of the backlash, a pressure angle; a pitch circle diameter, respectively. Then, the following relational expression holds therefor:

$$\Delta RA1 = \pi D/(360 \times 60 \times 2 \times \tan \alpha).$$

When the pitch circle diameter ranges 80 mm to 100 mm, ΔRA1, that is, an amount of change in the gearing angle RA, which is needed for changing one arc-minute of the backlash, should range 22 μm to 28 μm.

For example, in a case that the backlash in the neighborhood B1 of the neutral position C is −1 arc-minute, and that the backlash in the remaining region B2 is 4 arc-minutes, an amount ΔRA of change in the gearing radius RA, which is needed for setting the difference in backlash between both the regions to be 5arc-minutes, is thus given by the following equation:

$$\Delta RA = 5 \times \Delta RA1,$$

and should be set in such a way as to range 0.1 mm to 0.15 mm.

As described above, according to the invention, noises produced during straight traveling on a bad road, for example, a gravel road can be prevented by setting the backlash in the neighborhood region B1 of the steering neutral position C, to be relatively small.

In the remaining region B2 other than the neighborhood region B1, that is, most of the regions, the backlash is set to be relatively large. Thus, increase in the resistance torque can be suppressed. Incidentally, even when the vehicle travels on a bad road, noises are hard to be produced in a case where power is transmitted from an electric motor by a worm shaft and a worm wheel during a steering operation. Consequently, even when the backlash is large as abovementioned, no troubles are caused.

Consequently, occurrences of noises can be prevented, and the increase in the resistance torque can be suppressed. This can be achieved by a simple configuration in which the bias portion 61 is provided in a part of outer-shaped portions of teeth of the worm wheel 12.

As described above, in the remaining region B2, that is, in most of the regions, the backlash is set to be relatively large. Thus, even in a case that the synthetic resin member 12b is used in at least a part of the worm wheel 12, similarly to this embodiment and that this synthetic resin member 12b changes in size owing to temperature expansion, moisture absorption, and swelling, there is no fear that the backlash is too small. That is, a large margin for change in size of the synthetic resin member 12b can be set.

On the contrary, even when the synthetic resin member 12b wears out, occurrences of noises can effectively be suppressed, because the backlash is preliminarily set by the bias portion 61 to be small in the neighborhood B1 of the neutral position C.

Incidentally, in this embodiment, a worm wheel entirely made of iron may be employed as the worm wheel 12.

As shown in FIG. 5A, the graph in the neighborhood region B1 is shaped like a trapezoid. The bias portion 61 may be adapted to have a shape smoothly changing so that each of the corner portions of the trapezoid is smoothly R-shaped.

Incidentally, practically, when the bias portion 61 in the remaining region B2 other than the neighborhood region B1 of the neutral position C arrives at the gearing part A, a steering assisting force acts. Moreover, because a steering wheel is being used, the inertia of a steering system acts at that time. Thus, the return of a steering wheel is hardly affected. Additionally, there is no adverse effect on a steering feeling.

Figure 6:
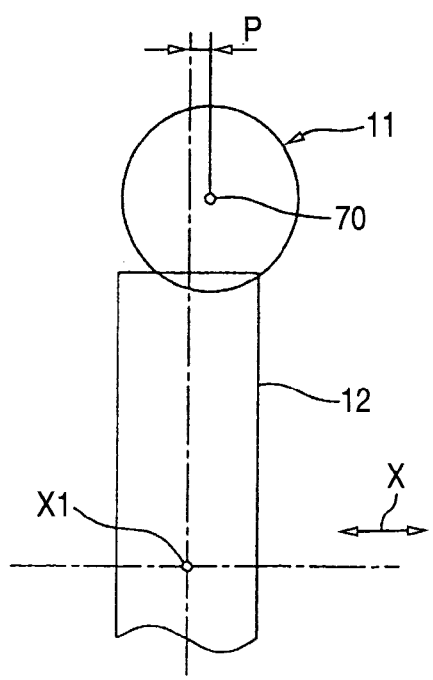
FIG. 6 is a schematic view illustrating a worm shaft and a worm wheel of another embodiment of the invention, which mesh with each other.

Referring next to FIG. 6, there is shown another embodiment of the invention. As shown in FIG. 6, in this embodiment, the position of a shaft center 70 of the worm shaft 11 is offset from the center position X1 (corresponding to a normal position) in an axial direction X of the worm wheel 12 by a predetermined offset amount P. This embodiment can reduce increase in the resistance torque and suppress the generation of noises, similarly to the previously described embodiment. Moreover, this can be achieved by a simple configuration in which the position of the shaft center 70 of the worm shaft 11 is offset.

Incidentally, the invention is not limited to the embodiments. Various modifications may be made within the scope of the invention. Although it has been described by way of example in the foregoing description of the embodiment that the bias portion 61 biased in the radial direction is provided in the worm wheel 12, a bias portion biased in a radial direction may be provided in the worm shaft 11.

What is claimed is:

1. An electric power steering apparatus adapted to transmit power supplied from an electric motor for assisting steering, the electric power steering apparatus comprising:
   a driving gear and a driven gear through which the power is transmitted,
   wherein a first backlash between the driving gear and the driven gear in a first range of steering angles including a steering neutral position is smaller than a second backlash in a second range of steering angles, and wherein at least one of said driven gear and said driving gear comprises a bias portion that sets said first backlash, and wherein said driven gear includes said bias portion formed by biasing a part of an outer periphery of teeth in a direction in which the first backlash is decreased.

2. The apparatus according to claim 1, wherein the driving gear comprises a worm, the driven gear comprises a worm wheel, and a shaft center of the worm is offset in an axial direction of the worm wheel by a predetermined offset amount.

3. The apparatus of claim 1, wherein said first range of steering angles comprises a steering angular range on each side of said steering neutral position.

4. The apparatus of claim 3, wherein said first range of steering angles comprises a substantially equal steering angle range on each side of said steering neutral position.

5. The apparatus of claim 4, wherein said first range of steering angles comprises about twenty degrees of steering angle.

6. The apparatus of claim 3, wherein said second range of steering angles comprises a range of steering angles that exceeds said first range of steering angles.

7. The apparatus of claim 1, wherein said backlash changes gradually between said first range of steering angles and said second range of steering angles.

8. The apparatus of claim 1, wherein at least one of said driving gear and said driven gear comprises a first radius of a pitch circle corresponding to said first range of steering angles that is larger than a second radius of a pitch circle corresponding to said second range of steering angles.

9. The apparatus of claim 8, wherein the at least one of said driving gear and said driven gear comprises a gearing radius that is smaller than said first radius.

10. The apparatus of claim 8, wherein the at least one of said driving gear and said driven gear comprises a gearing radius that is larger than said second radius.

11. An electric power steering apparatus adapted to transmit power supplied from an electric motor for assisting steering, the electric power steering apparatus comprising:

a driving gear and a driven gear through which the power is transmitted, wherein a first backlash between the driving gear and the driven gear in a first range of steering angles including a steering neutral position is smaller than a second backlash in a second range of steering angles, wherein at least one of said driven gear and said driving gear comprises a bias portion that sets said first backlash, and wherein:

$\Delta RA$ corresponds to an amount of change in a gearing angle RA per arc-minute of backlash between said driving gear and said driven gear;

$\alpha$ corresponds to a pressure angle between said driven gear and said driving gear;

D corresponds to a pitch circle diameter of one of said driving gear and said driven gear; and $\Delta RA = (\pi \times D)/(360 \times 60 \times 2 \times \tan(\alpha))$.

12. The apparatus of claim 8, wherein the pitch circle diameter ranges from about 80 millimeters to about 100 millimeters and wherein the amount of change in said gearing angle RA per arc-minute of backlash $\Delta RA$ comprises a range of about 22 micrometers to about 28 micrometers.

13. An electric power steering apparatus adapted to transmit power supplied from an electric motor for assisting steering, the electric power steering apparatus comprising: a driving gear and a driven gear through which the power is transmitted, wherein a first backlash between the driving gear and the driven gear in a first range of steering angles including a steering neutral position is smaller than a second backlash in a second range of steering angles, and wherein at least one of said driven gear and said driving gear comprises a bias portion that sets said first backlash, and wherein said bias portion is provided on an outer peripheral portion of the teeth of the at least one of said driving gear and said driven gear.

14. A power steering apparatus comprising: a driving gear; and a driven gear engaging the driving gear such that a first backlash between the driving gear and the driven gear is smaller in a first range of steering angles than a second backlash in a second range of steering angles, wherein at least one of said driven gear and said driving gear comprises a bias portion that corresponds to said first range of steering angles, and wherein said bias portion is provided on an outer peripheral portion of teeth on the at least one of said driving gear and said driven gear.

15. The apparatus of claim 14, wherein the first range of steering angles includes a neutral position for a steering wheel of a vehicle comprising the power steering apparatus.

16. The apparatus of claim 15, wherein the neutral position corresponds to a straight traveling condition for said vehicle.

17. The apparatus of claim 14, wherein one of said driving gear and said driven gear comprises a worm gear and the other of said driving gear and said driven gear comprises a worm wheel engaging said worm gear.

18. The apparatus of claim 17, wherein a shaft center of said worm is offset in an axial direction relative to said worm wheel by a predetermined offset amount.

19. The apparatus of claim 14, wherein at least one of said driving gear and said driven gear comprises a first radius of a pitch circle corresponding to said first range of steering angles that is larger than a second radius of a pitch circle corresponding to said second range of steering angles.

20. The apparatus of claim 19, wherein the at least one of said driving gear and said driven gear comprises a gearing radius that is smaller than said first radius.

21. The apparatus of claim 19, wherein the at least one of said driving gear and said driven gear comprises a gearing radius that is larger than said second radius.

22. The apparatus of claim 14, wherein the first range of steering angles comprises a neutral steering position.

23. The apparatus of claim 22, wherein said first range of steering angles comprises a substantially equal steering angle on each side of said neutral steering position.

24. The apparatus of claim 22, wherein said first range of steering angles comprises about twenty degrees of steering angle.

25. The apparatus of claim 14, wherein said first backlash changes gradually between said first range of steering angles to said second backlash in said second range of steering angles.

26. The apparatus of claim 14, further comprising a motor for providing a steering assistance torque to said driving gear and wherein said first range of steering angles corresponds to a range of steering angles where said drive motor provides a smaller steering assistance torque than said second range of steering angles.

27. A power steering apparatus comprising:

a driving gear; and a driven gear engaging the driving gear such that a first backlash between the driving gear and the driven gear is smaller in a first range of steering angles than a second backlash in a second range of steering angles, wherein at least one of said driven gear and said driving gear comprises a bias portion that corresponds to said first range of steering angles, and wherein:

$\Delta RA$ corresponds to an amount of change in a gearing angle RA per arc-minute of backlash between said driving gear and said driven gear;

$\alpha$ corresponds to a pressure angle between said driven gear and said driving gear;

D corresponds to a pitch circle diameter of one of said driving gear and said driven gear; and $\Delta RA = (\pi \times D)/(360 \times 60 \times 2 \times \tan(\alpha))$.

28. The apparatus of claim 27, wherein the pitch circle diameter ranges from about 80 millimeters to about 100 millimeters and wherein the amount of change in said gearing angle RA per arc-minute of backlash $\Delta RA$ comprises a range of about 22 micrometers to about 28 micrometers.

* * * * *